3,560,285
PROCESSES FOR PRODUCING COMPOSITE PANELS
Richard C. Schroter, Orinda, David G. Berg, Oakland, and William A. Schuerman, Jr., Pleasant Hill, Calif., assignors to Kaiser Aluminum & Chemical Corporation, Oakland, Calif., a corporation of Delaware
Filed Feb. 6, 1967, Ser. No. 614,070
Int. Cl. B32b 5/18
U.S. Cl. 156—79                                                       16 Claims

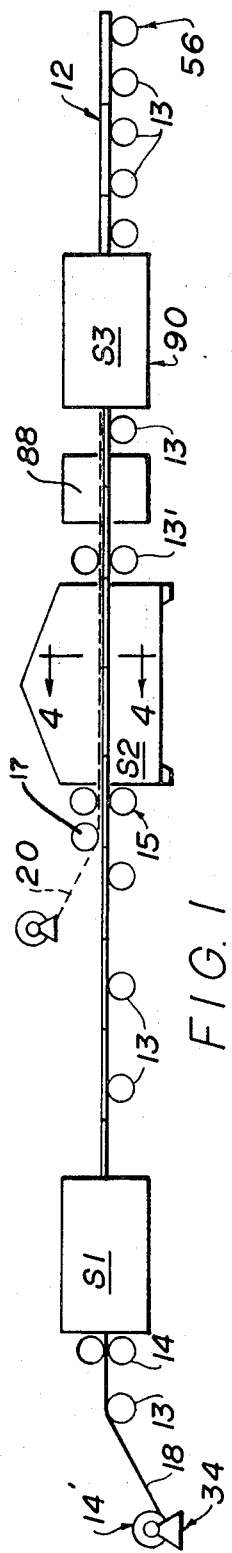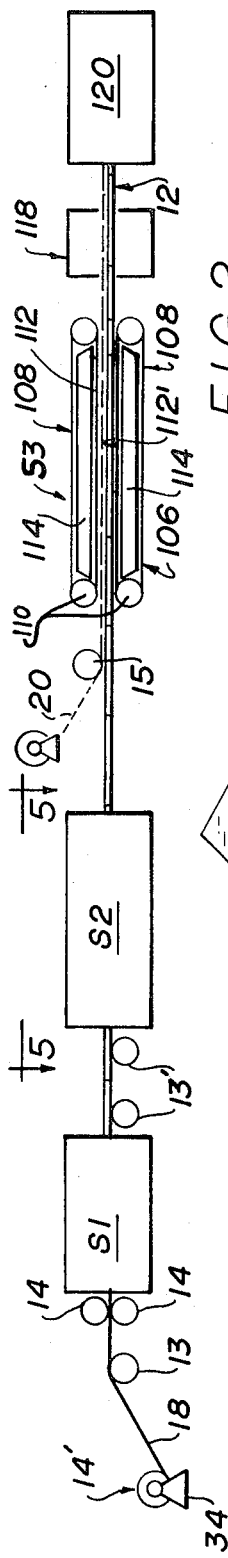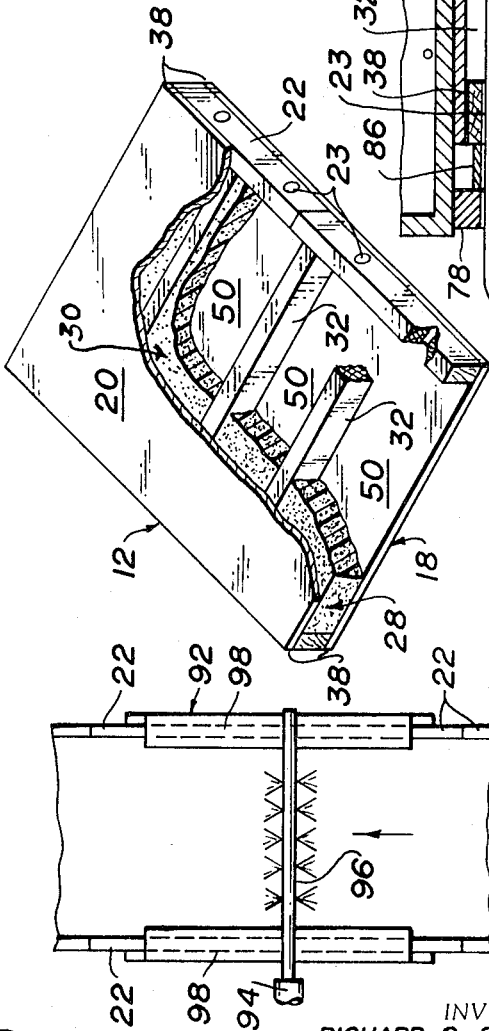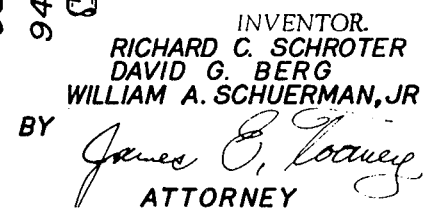
INVENTOR.
RICHARD C. SCHROTER
DAVID G. BERG
WILLIAM A. SCHUERMAN, JR
BY
ATTORNEY

ABSTRACT OF THE DISCLOSURE

Processes for producing substantially distortion free composite panels made up of one or more outer relatively thin metal facings, edge stiffeners, glue lines having delayed setting up characteristics interposed between and having an affinity for the stiffeners and the outer metal facing or facings and a foamable core or backing material and the products produced thereby. During the processes of producing composite panels wherein a panel assemblage comprised of a stiffener, a glue line of the type described and a facing is subjected to thermal cycling involving elevated temperatures, the glue line initially exhibits sufficient tackiness and strength for floatingly and sealably bonding a stiffener to a metal facing while still permitting the facing to freely expand and contract relative to the stiffener without being dislodged therefrom and while still maintaining an effective sealed relationship therewith. The elevated temperature conditions occur during application and curing of the foamable core or backing material in situ against or between one or more facings. It is only after discontinuance of the thermal cycling that the glue line is allowed to finally set at normal room temperatures and all the elements of the composite panel are allowed to become fully integrated one with another. By the improved use of a glue line having delayed setting up characteristics wherein the final setting up and curing of the glue line does not occur until after thermal cycling has been discontinued, the introduction of wrinkles, buckles, and distortions in a metal facing or facings in the final product is inhibited and a facially attractive product is produced.

BACKGROUND OF THE INVENTION

This invention relates particularly to composite panels and more particularly to composite panel assemblages made up of relatively thin metal facings, stiffeners and foamable core or backing materials and to processes for producing the same.

Composite metal clad panels having foamable core or backer materials and stiffening elements have been produced in the past. However, these panels have not always been satisfactory in that the metal facings of such panels have not always been relatively free of wrinkles, buckles or other undesirable distortions particularly in the case of large sized panels involving the use of relatively thin metal facings of large expanse.

SUMMARY OF THE INVENTION

It is the primary purpose of the instant invention to provide a reliable and inexpensive process for manufacturing a composite panel having a relatively distortion free outer facing or facings and the product produced thereby, wherein the panel facing or facings because of economic considerations are preferably made of relatively thin metal or the like and are not fixedly anchored to stiffening elements or the like until after elevated temperature exposures of the panel assemblage have, for all practical purposes, been discontinued. By virtue of the delayed fixedly securing of a facing to a stiffener, the facing is allowed to freely expand and contract during the thermal cycling which occurs during various manufacturing steps in an unrestrained fashion so that the formation of wrinkles, buckles and other distortions in the metal facings is inhibited in the final product.

BRIEF DESCRIPTION OF THE DRAWINGS

In the accompanying drawing:

FIG. 1 is a schematic and elevational view on a reduced scale of one type of multi-station production line that can be used to produce composite panels in accordance with the instant invention;

FIG. 2 is a schematic and elevational view on a reduced scale of another type of multi-station production line that can be used to produce composite panels in accordance with the instant invention;

FIG. 3 is an enlarged perspective view with portions broken away of a given length of a composite panel that can be produced on the production lines of FIG. 1 or FIG. 2;

FIG. 4 is an enlarged cross-sectional view taken generally along line 4—4 of FIG. 1 and illustrates certain equipment used in carrying out the steps of the process illustrated by the production line of FIG. 1; and FIG. 5 is a plan view generally taken along line 5—5 of FIG. 2.

With further reference to the drawing and in particular FIGS. 1–3, these figures of the drawing illustrate certain preferred embodiments of a composite panel 12 and multi-station production lines 10 and 10' that can be used to practice preferred processes for producing the panel 12. In one preferred embodiment, panel 12 is generally comprised of a pair of outer relatively thin metallic facings or cover sheets 18 and 20, such as facings of aluminum or aluminum alloy materials, side stiffeners 22 of cellulosic materials such as wood or the like bonded to two opposing marginal portions of the facings 18 and 20 and a core 28 of appropriate foamable material, such as urethanes, styrenes and certain epoxy resinous materials and with the foaming of these individual materials being accomplished by the appropriate well-known foaming techniques used at elevated temperatures for each of the respective materials. The relatively thin metallic facings 18 and 20 are usually of the same thickness and can be on the order of between 0.0015" to 0.050".

The core 28 is made from a sufficient amount of foamable material to completely fill the cavity existing between the side stiffeners 22 and the metal facings 18 and 20. The top and bottom surfaces of stiffeners 22 are advantageously precoated with a continuous line 38 of an adhesive which forms a glue line between a stiffener 22 and a facing 18 or 20 and which has delayed setting up characteristics as noted more fully hereinafter, such that the adhesive will only floatingly and sealably bond stiffeners 22 to layers 18 and 20 during various process involved in the operation of production lines 10 and 10' and then finally set up and for all practical purposes fixedly secure stiffeners 22 to the cover layers 18 and 20 after all process thermal cycling has ceased and the assembled composite panel product has exited from its particular production line.

As used throughout the specification and claims, the terms "floatingly and sealably bonding" mean that while stiffeners such as stiffeners 22 and cover layers 18 and 20 are held together without separation or the breaking of the adhesive seal therebetween they are still free to shift or move relative to one another during thermal cycling or subjection to elevated temperatures during the practice of various process steps.

If desired, additional interior cross stiffeners or separators 32 can be used to divide the interior of a panel assemblage into compartments that can be filled with core material 28 in a fashion to be described. These stiffeners 32 can, if desired, be made of materials similar to stiffeners 22.

Since the facings 18 and 20 are of a dissimilar material from the various stiffeners or dividers, e.g. metal vs. cellulosic materials, the thermal coefficients of expansion and contraction of facings 18 and 20 are quite different from those of stiffeners 22 and 32. Unless compensated for in the improved fashion proposed when the panel assemblage of core 28, facings and stiffeners is subjected to elevated temperatures in order to effect final curing and bonding of the foamable core materials to the facings 18 and 20 and stiffeners 22, the facings and stiffeners will tend to expand and contract in significantly different amounts and if they are rigidly secured together or restrained as to relative movement or shifting during the various expansion and contraction cycles, severe stresses will be induced in the facings which will be carried over into the final product in the form of undesirable buckles, wrinkles, bowing or other distortions of the facings. In addition to allowing free expansion and contraction of the facings relative to the stiffeners, a certain amount of tension, as will be noted hereinafter, is exerted upon a facing at selected areas whereby the expansion is taken up and not allowed to result in wrinkling or distortion.

The above concept of floatably and sealably bonding the stiffeners to facing sheets and the use of facing tensioning will now be discussed with reference to various ways of advantageously using this concept in the production of foamed core or foam backed panels, reference first being made to the production line of FIG. 1.

Located at the beginning of line 10 in FIG. 1 is a reel 14' mounted on a suitable pier-like strand 34. The reel contains a coil of metal stock which is to be used for one of the panel facings such as facing 18. This coil can have widths of from 4 feet to 8 feet across. Facing 18 can be either continuously or intermittently paid off of reel 14' and continuously or intermittently advanced through stations $S_1$–$S_3$ and by means of support and drive rolls 13 and by pinch and driving rolls 13' located at the exit end of station $S_2$ depending on how these rolls are driven by means well-known in the art. Even when rolls 13 and 13' are driven continuously, the facing 18 should still move preferably at a rate of between 4 to 30 feet per minute whereby all the various operations contemplated can be readily performed in a rapid fashion conducive to mass production requirements. Rolls 14 adjacent the entry end of station $S_1$ act as drag rolls and exert a slight back pressure or end type tensioning on facing strip 18 as it is fed along line 10. The backward pull can be on the order of 12 lbs. per foot of width of facing 18. In any event, although the drag exerted by rolls 14 is not sufficient to prevent the desired forward movement of facing 18, it is just enough to maintain the facing taut between rolls 13' and 14 particularly when portions of the advancing facing 18 are raised to elevated temperatures as they pass through station $S_2$.

At station $S_1$ of line 10 successive pairs of wooden stiffeners 22 are applied to the opposing marginal portions of facing 18 in two continuous lines after the top and bottom surfaces of the stiffeners have been coated with an appropriate and continuous coating of adhesive 38 in order to floatingly and sealably bond stiffeners 22 to facing 18 and later to facing 20. The adhesives 38 employed to meet the delayed setting up and floatingly and sealably bonding characteristics desired can be a solvent-type adhesive which also has an excellent affinity for metals, such as aluminum and aluminum alloys, and cellulosic materials. Prior to fully setting up, the adhesive should initially exhibit excellent tackiness and binding strength while still being sufficiently elastic to allow shifting of the glued parts without their becoming disengaged.

It is also to be understood that the adhesive used should have affinity for the materials used as stiffeners and facings and that it should also not be adversely affected composition-wise by contact with such materials.

One example of a suitable adhesive or glue line is that manufactured and sold by Wilhold Glues, Inc., of Los Angeles, Calif., and Chicago, Ill. under the trademark "Glu-on." This "Glu-on" adhesive produced by Wilhold Glues, Inc. is a neoprene type adhesive having a solvent base. The solvents incorporated in this adhesive comprise a mixture of ketones and aromatic solvents which produce a delayed setting adhesive. Although good tacking is instantaneous, the final setting of the adhesive will occur only after standing for a prolonged period at room temperature of about 24 to 96 hours or in a shorter period if appropriately subjected to elevated temperatures. In practicing the instant invention, the time period of exposure to elevated temperatures is so small as not to prematurely accelerate the final setting up of the aforesaid adhesive. It is to be further understood that adhesives having characteristics similar to the desirable characteristics described can also be used to advantage in the practice of the instant invention.

Prior to depositing the adhesively covered stiffeners on the margins of facing 18, each stiffener 22 in one line of stiffeners can also be provided with a plurality of spaced openings 23 and it is to be understood that in order to facilitate the locating of stiffeners 22 on the edges of the strip 18 at station $S_1$, that a strip supporting table or bed (not shown) and made up of rollers or the like can be provided. After the stiffeners 22 have been applied to the marginal portions of strip 18 in full, abutting, end-to-end relationship with each other as well as in alignment with an associated longitudinal margin of facing 18, the facing 18 along with stiffeners 22 is advanced to station $S_2$ by means of the support and driving rollers 13.

If desired and prior to entrance of facing 18 into station $S_2$ and application of the foam material forming 28 at station $S_2$, an operator can first deposit by hand or by appropriate equipment (not shown) a series of preformed interior stiffeners or dividers 32 crosswise of moving facing 18 and outside stiffeners 22 at selected spaced points along facing 18 whereby, as indicated in FIG. 3, stiffeners 32 act to divide the advancing panel assemblage into a series of open cells or compartments generally indicated at 50. In order to hold stiffeners 32 in the desired position on facing 18 and attach stiffeners 32 to the facing 18 and later to facing 20, the upper and lower faces thereof can be precoated with an adhesive 38 in the same fashion as stiffeners 22.

As the facing 18 is advanced continuously or intermittently from station $S_1$ to station $S_2$, by means of appropriate rotation of rolls 13 and 13' along with the various elements or materials applied thereto, the metallic facing 20 can be pulled from the coil body 16 and guided by the idler roll 17 down upon and into contact with the adhesive 38 on the topsides of stiffeners 22 and the topsides of stiffeners 32 when the same are used after the leading edge of the coil has been passed under roll 17. As the idler roll 17 forces the upper metal facing 20 into contact with adhesive coatings 38 on the various stiffeners, the pressure of the roll will force adherence of the facing 20 to the various stiffeners through the medium of adhesives 38 whereby facing 20 will be floatingly and sealably bonded to stiffeners 22 in the same fashion as facing 18. The application of a metallic facing 20 further results in the forming of a cavity between facings 18 and 20 which is also broken down into compartments 50 when stiffeners 32 are used whereby these compartments or a single overall cavity between stiffeners 22 and facings 18 and 20 are or is now made ready for the reception of foamable material which, upon curing, will form the core 28 or at least the major portion of the core 28 when interior stiffeners are used. Rolls 15 located immediately adjacent the entrance of station S₂ can act in the same fashion as the aforesaid drag rolls 14.

As indicated in FIG. 4, station S₂ includes a press type apparatus 66 generally comprised of a reciprocal upper platen 68 and a fixed lower platen 70 made from appropriate material. Platen 70 operates to support and slidingly engage facing 18 and the various elements attached thereto. The upper platen 68 includes suitable crank type means (not shown) for reciprocating the upper platen 68 between appropriate raised and lowered positions. A pair of laterally spaced T-shaped spacer blocks 76, each of which includes a stem portion 84 and a cap portion 78, are mounted on the opposing longitudinal edges of platen 70. Normally, one line of these blocks 76 is provided with openings 86 which generally correspond in size and spacing to the openings 23 previously made in the stiffeners 22 in one line of stiffeners and appropriate means can be used to line up the openings in stiffeners 22 and T-bars 76 at station S₂. The end of stem portion 84 of each T-block 76 is adapted to slidingly engage a stiffener 22.

The platens 68 and 70 further include appropriate electrical heating elements generally indicated at 80 and disposed in a suitable fashion within the structure of the platens 68 and 70 for heating the platens 68 and 70 and in turn the facings 18 and 20 of the panel product 12 to a desired elevated temperature level prior to and during introduction of the foamable material forming core 28. The foamable material is introduced into compartments 50 of the panel assemblage by means of standard injector tubes 82 which are removably inserted in the aligned openings 86 and 23 in bars 76 and stiffeners 22.

The foamable material used in this instance can be of any suitable type such as urethanes admixed with suitable blowing agents and which also have excellent affinities for metals, such as aluminum and aluminum alloys and wood and without being adversely affected thereby. In this instance the foam material should be one properly formulated for froth application and which can be readily applied through tubes 82. One suitable type of foam composition can be described as follows:

Composition: Parts by wt.
Sorbitol based polyether polyol (commercially available as G2571 produced by Atlas Chemical Industries, Inc. and having a hydroxyl number of about 450) _____ 60
Sorbitol based polyether polyol (commercially available as Pluracol SP 560 produced by Wyandotte Chemicals Corp. having a hydroxyl number of about 672) _____ 20
Hydroxy terminated phosphonate ester (commercially available as "Fyrol" 6, produced by Stauffer Chemical Co. and having an approximately hydroxyl number of 440) __ 20
Trichlorofluoromethane _____ 30
Silicon-glycol copolymer (commerically available as L-5310, produced by Union Carbide Corp.) _____ 1.5
Dimethylethanolamine _____ 1.5
Triethylenediamine _____ 0.5
Polymethylene-polyphenylpolyisocyanate (equivalent weight about 132) _____ 122.6

In the case of line 10′ wherein the foamable material is applied by sprays from appropriate nozzles, the foam material should be formulated for spray application. A suitable foam composition for spray application can be described as follows:
Methylglucoside based polyol (commercially obtained as G–375 D.M. produced by Olin Mathieson Chemical Co. and having an OH number of about 375) _____ 100.0
Trichlorofluoromethane _____ 30
Silicon-glycol copolymer surfactant (commercially obtainable as Dow Corning 193 surfactant) ____ 1.5

Dimethylethanolamine _____ 3
Polymethylene-polyphenylpolyisocyanate (equivalent weight about 132) _____ 89

In order to accelerate foaming of the injected foamable material, the metallic facings are advantageously raised to a temperature on the order of between 150° to 300° F. preferably just prior to and during introduction of the foamable materials at station S₂ which heat is then transmitted to the foamable material. At the temperatures aforesaid, the foamable material will bond and cure in situ in about 1 to 4 minutes time. This will, of course, result in a sharp expansion of the portion of facings 20 and 18 now located at station S₂ and, even though some of this heat is carried off and dissipated by the remainder of the facings 18 and 20 acting as a heat exchanger, much of the heat will remain in the portion of the facings located in station S₂. At this time also drag rolls 14 operate to take up the slack in the facings resulting from the expansion thereof. The upper platen 68 in its lowered position as shown in FIG. 4 acts to heat up the metal facings 18 and 20. The position of the several platens 68 and 70 and both spacer blocks 76 at this time is such that they all cooperate merely to slidably engage and restrain the facings 18 and 20 from separating at any point from the stiffeners 22 and to produce a compression of the foaming material during foaming of the introduced foamable material into each compartment 50 or the central cavity but while still permitting free thermal expansion of the facings 18 and 20 relative to the stiffeners 22. Further, the platens and spacer blocks are not brought into such a closed relation whereby they act to hold the various elements of the panel assemblage in a vice-like grip which would inhibit the shifting of the various elements of the panel assemblage relative to one another.

Injector tubes 82 are inserted into each of the compartments 50 in such a manner whereby a tube 82 is initially fully inserted in the compartment 50 prior to release of the foamable material forming core 28 in the form of a liquid within which a suitable blowing agent has been incorporated. The operator then gradually withdraws the fully inserted forward end of the tube 82 from the particular compartment 50 at a predetermined rate during continued release of the foamable material 28 so as to assure proper foaming of the material without the formation of any voids until a compartment 50 or the overall cavity has been completely filled in the amount desired. These tubes 82 can be mounted on appropriate reciprocating equipment so as to follow the panel assemblage during the short period of foam injection after which the tubes 82 are withdrawn from the panel assemblage and the tube carrier returned to its starting position.

The openings 23 in the stiffeners 22 and 86 in the T-bar are somewhat larger than the tubes 82 and thus serve the dual function not only in that they provide a convenient means for inserting the injector tube 82 into each compartment 50 but also as providing a means for ventilating each compartment 50 during injection of foamable material therein so as to minimize the formation of voids in the foamed section 30 being formed in the cavity or compartments 50 as the case may be. Depending upon the type of foamable material used for core 28, the initial part of the foaming action can even involve a momentary extraction of heat from the metallic facings which tends to reduce the heat content of the facings resulting from contact with platens 68 and 70. In this instance, the foamable material of core 28 when foaming is initiated may then result in an exothermic reaction which puts heat back into the facings 18 and 20. In any event, irrespective of these changes in thermal conditions which may be referred to as thermal cycling, these changes are fully compensated for as far as stiffeners and facings are concerned due to the floatingly bonded and sealed relationship of these elements and drag tensioning whereby the facings are free to shift and move relative to one another during this thermal cycling whereby serious stresses and distortions are not induced in the thin metal facings and carried over into the final product.

The preferred rate of travel of 4 to 30 feet per minute of the panel assemblage is sufficient for the foamable material to substantially cure and bond in situ to the metallic facings 18 and 20 and the stiffeners. The elevated temperatures and time exposure of the assemblage thereto, however, will not be such as to cause a charring or destruction of the stiffeners or adversely affect the adhesive coatings 38.

After passage of the panel assemblage through station $S_2$, it is next passed to a cutting device 88 where the usual sawing equipment can be employed to cut panels of given length from the moving assemblage. If the line is a continuous line, the sawing equipment can be movably mounted in a reciprocating fashion whereby it will follow the assemblage as the sawing operation proceeds. It is to be understood that even though the stiffeners 22 may not be rigidly locked to the facings 18 and 22 at this time, no practical sawing problems are involved since the foamed core 28 is bonded to the foam over the major portion of the area cut and the action of the saw is so rapid that little, if any, shifting of a stiffener and a facing takes place.

From the sawing station, the finished panels are pushed by the moving panel assemblage of facings 18 and 20, etc. to an inspection table 90 located at station $S_3$. After inspection the individual panels are passed along runout table 56 to a storage area where the adhesive materials 38 are allowed to finally cure and set up at room temperature so as to provide relatively rigid glue lines between stiffeners and facings.

The second multi-station production line 10' will now be described. In this instance depending on the mode of operation desired the panel assemblage may be moved continuously or intermittently forward by various means including drive and supporting rolls 13 and 13' as in the case of line 10. Drag rolls 14 and 15 having similar functions to rolls 14 and 15 of line 10 can also be used. In line 10' the metal facing 18 is paid off of a coil 14' and fed to station $S_1$. At station $S_1$ stiffeners 22 are deposited in abutting end-to-end relation along the longitudinal edges of the facing 18 during its passage through station $S_1$ in the same fashion as in the case of line 10 and the top and bottom surfaces of stiffener 22 can be pretreated with adhesive coatings 38 prior to being deposited on the facing 18 at station $S_1$.

From station $S_1$ the panel assemblage next passes to station $S_2$ in the direction indicated by the arrow in FIG. 5 where a selected amount of the foamable material forming a core 28 in the final product is deposited directly on the upwardly facing surface of facing strip 18. As indicated in FIG. 5, a bed or table 92 can be used to support the panel assemblage during its passage through station $S_2$. The foamable material which can be of the type and formulated for spray application previously described is directed in a conventional fashion and in a liquid state from a source (not shown) through a length of conduit 94 to the spray tube 96 provided with suitable spray nozzles disposed above the moving facing 18. The amount of foamable material dispensed will, of course, effect the density of the foam but the foamable material dispensed should be in an amount sufficient to form a uniformly foamed core layer 28 and yet fill the recess or cavity as defined by the spacing of stiffeners 22 on facing 18 and the overall height of stiffeners 22 plus the thickness of adhesive coatings 38 thereon. Appropriate masking elements 98 suitably mounted on the edges of the table 92 can be provided as protective coverings at station $S_2$ for the adhesive coatings 38 attached to the top of the strips 22. When the foamable material is sprayed on in the manner aforementioned at station $S_2$ of production line 10', all or some of the inner stiffeners or dividers 32 can be omitted from the final product.

From station $S_2$, the assemblage passes to station $S_3$. Although as shown in FIG. 2 stations $S_2$ and $S_3$ are shown as being located somewhat far apart, it is to be understood that they are located as close together as possible consistent with being able to apply the top facing 20 just before the advancing panel assemblage enters the heating zone of station $S_3$ in line 10'. Roll 15 in line 10' acts in addition to being a drag roll to direct the top facing 20 down upon and into engagement with the adhesive coatings 38 on stiffeners 22 just prior to entrance of the panel assemablage into station $S_3$. In production line 10' the stiffeners 22 that are used can also include a series of openings similar to the openings 23 provided in strips 22 in line 10 in order to ventilate the foam layer 23 once the foamable material forming core 28 is covered by the sheet layer 20 during curing or foaming of this material at station $S_3$.

In addition to the driving rolls 13, line 10' can also employ a driving means 106 of conventional design and the operation of which is fully synchronized with rolls 13. Driving means 106 can be comprised of spaced upper and lower endless driving belts 108 of suitable heat resistant materials supported and driven by spaced pulleys 110 also of heat resistant materials. The lower reach 112 of the upper belt is adapted to engage facing 20 while the upper reach 112' of the lower belt is adapted to engage facing 18. The upper set of spaced pulleys 110 are of a sufficient size so as to provide a clearance between the upper and lower reaches of the upper belt 108 sufficient to accommodate a conventional upper heating platen 114. A similar arrangement exists in the case of lower belt 108 which accommodates a lower heating platen 114 similar to upper platen 114. Both platens 114 extend fully across the backs of their associated belts between the spaced pulleys 110. Belts 108 may be perforated, if desired, to promote transfer of heat from the platens 114 and in any event are made of material that is not adversely affected by the heat from the platens 114. The elevated temperatures and various temperature changes in the facings occurring at station $S_3$ can be substantially the same as those occurring at station $S_2$ in line 10 depending on the foamable materials used. In any event, the advantageous use of the slow to set up adhesive coatings 38 fully compensates for all of the varied thermal conditions at station $S_3$ in line 10' as well as at station $S_2$ in line 10 and the time and amount of elevated temperature exposure at station $S_2$ is not sufficient to produce an accelerated setting up of the adhesive 38.

In the event that belts 108 acting only in conjunction with stiffeners 22 are not adequate to restrain the facings 18 and 20 from separating from the stiffeners or rails 22 due to the foaming of the foamable material and to effect the appropriate compressive action on the foaming material, block elements (not shown), can be provided at station $S_3$ to slidably engage the outward facing surfaces of the rails 22 in a similar manner as blocks 76 in line 10 and shown in FIG. 4. The pressures exerted by belts 108 upon facings 18 and 20 are, of course, not sufficient as to prevent freedom of movement of facings 18 and 20 during expansion and contraction of the same.

After the heating and curing of the foamable material making up core 28 and its consequential bonding to facings 18 and 20 and stiffeners 22, at station $S_3$, the final panel assemblage is next passed to an appropriate sawing device 118 similar to device 88 in line 10 which severs the advancing panel assemblage into individual panels 12. After being cut to length, the individual panels 12 pass on to an inspection table 120 at station $S_4$ and from table 120 to a suitable storage area where adhesive coatings 38 are allowed to finally set up and cure. Although the facings 18 and 20 are shown to be made of flat material, it is obvious that either facing or both can be embossed or corrugated depending on the surface finish desired.

From the above it will be observed that reliable and relatively inexpensive processes have been shown and described for manufacturing relatively distortion free and relatively thin metal faced composite panels involving the use of readily available foamable materials as the cores therefor and the products produced thereby. The teachings of the invention are also applicable to the manufacture of composite panels wherein only one metal facing is employed so that the foamable material acts as a backer rather than a core material. Such a product could be made, for example, on either production line 10 or 10' in which case the top facing 20 would be omitted and in lieu thereof a heat resistant web of material which does not adhere to the foamable material, such as silicon impregnated Kraft release paper, could be unwound from the particular payoff reel for a facing 20 so as to serve as a temporary covering which covering is then rewound on a reel (not shown) aft of the sawing devices of FIGS. 1 and 2. In this instance also the adhesive material 38 would be omitted from the top face of stiffeners 22. At the same time appropriate measures well-known in the art can be taken to prevent bonding of the foam to certain parts of the apparatus at station $S_2$ in line 10 and station $S_3$ in line 10'. Further, the teachings of the invention are applicable to the manufacture of panels having facings other than the metal facings described, such as composite facings of metal and plastic laminates, and stiffeners of other materials besides wood so long as the facings and stiffeners are made of materials which have significant differential expansion and contraction characteristics when subjected to elevated and cooling temperatures and which, if held in a fully restrained condition relative to each other at elevated temperature and without the exertion of whatever end-type or facial tensioning is required, would induce serious distortions in the facings which are carried over into the final product. Thus, the glue lines formed by the particular and desirable adhesives used do not form relatively rigid glue lines whereby all parts of the final product are fully integrated with each other until after the applicable manufacturing process steps have been for all practical purposes completed.

Advantageous embodiments of the invention have been shown and described. It is obvious to those skilled in the art that various changes and modifications may be made therein without departing from the spirit and scope thereof as set forth in the appended claims, wherein:

What is claimed is:

1. A process for producing composite panels provided with at least one stiffener and a substantially distortion free outer facing of relatively thin gauge material in which at least part of the thin gauge material is a metal material comprising the steps of selectively coating a stiffener having different expansion and contraction characteristics from those of said facing with an adhesive material having selected delayed setting up characteristics but sufficient initial bonding strength and tackiness so as to initially floatingly and sealably bond the stiffener to said facing, attaching said stiffener to said facing through the medium of said adhesive material, applying a foamable material to said facing and adjacent said stiffener and thereafter subjecting the panel assemblage comprised of facing, stiffener and foamable material to an elevated temperature for a relatively short period of time which is still sufficient to cause a foaming and curing of said foamable material in situ and a bonding of said foamable material to said facing and stiffener and during exposure of said panel assemblage to said elevated temperature allowing said facing and stiffener to freely move and shift relative to each other but without adversely affecting the bond between the facing and the stiffener produced by said adhesive material and thereafter allowing said entire assemblage to cool down from said elevated temperature to room temperature for a sufficient period of time for said adhesive material to fully set up and provide a relatively rigid glue line between said stiffener and facing.

2. The process as set forth in claim 1, including the step of applying end tension to said facing at least during the exposure of said facing to said elevated temperature.

3. A process for producing composite panels as set forth in claim 1, including the step of disposing a further stiffener on said facing crosswise of said first mentioned stiffener prior to the application of the foamable material to said facing.

4. A process as set forth in claim 1 wherein said stiffener is attached to said facing and said foamable material is applied to said facing and the overall assemblage exposed to an elevated temperature as said facing is advanced continuously past a series of work stations.

5. A process as set forth in claim 4 wherein the rate of advancement of said facing is on the order of 4 to 30 feet per minute.

6. A process for producing composite panels as set forth in claim 1 wherein said stiffener is made of cellulosic material and the facing is selected from the group consisting of aluminum and aluminum alloys.

7. A process as set forth in claim 6 wherein said foamable material is a urethane composition.

8. A process for producing composite panels provided with at least one stiffener and substantially distortion free opposed outer facings comprising the steps of coating a pair of opposed faces of a stiffener having different expansion and contraction characteristics from those of a pair of facings of relatively thin gauge materials with an adhesive material having selected delayed setting up characteristics, but sufficient initial bonding strength and tackiness so as to initially floatingly and sealably bond the stiffener to said facings; bringing one adhesive coated face of the stiffener into contact with one of said facings comprised at least in part of a metal material and attaching said one facing to the stiffener through the medium of said adhesive material; applying a foamable material to said one facing and adjacent said stiffener; therefter applying the second of said facings to the other opposed adhesive coated face of the stiffener and attaching said second facing to said stiffener through the medium of the adhesive material; then subjecting the entire panel assemblage comprised of facings, adhesively coated stiffener and foamable material to an elevated temperature for a relatively short period of time which is still sufficient to cause a foaming and curing of the foamable material in situ and a bonding of the foamable material to said facings and stiffener and during exposure of said assemblage to said elevated temperature allowing said stiffener and facings to freely move and shift relative to each other without adversely affecting the bonds between the facings and stiffener and thereafter allowing said entire assemblage to cool down from said elevated temperature to room temperature for a sufficient period of time for said adhesive material to fully set up and form relatively rigid glue lines between said stiffener and facings.

9. The process as set forth in claim 8, including the step of applying end tension to said facings at least during the exposure of said facings to said elevated temperature.

10. A process as set forth in claim 8 wherein said stiffener is attached to said one facing, said foamable material is applied to said one facing, said second facing is applied to the stiffener and the overall assemblage exposed to an elevated temperature while said one facing is advanced continuously past a series of work stations.

11. A process as set forth in claim 10 wherein the rate of advancement of the one facing is on the order of 4 to 30 feet per minute.

12. A process as set forth in claim 9 wherein the stiffener is made of a cellulosic material and said facings are selected from the group consisting of aluminum and aluminum alloys.

13. A process for producing composite panels provided with stiffeners and substantially distortion free opposed outer facings composed at least in part of metal comprising the steps of coating the opposing faces of a pair of stiffeners having differential expansion and contraction characteristics from those of the facings with an adhesive material having selected delayed setting up characteristics but sufficient initial bonding strength and tackiness so as to floatingly and sealably bond the stiffeners to said facings; bringing certain adhesive coated faces of the pair of stiffeners into contact with opposed marginal portions of one of the facings of relatively thin gauge material and attaching said one facing to the stiffeners through the medium of the adhesive coatings thereon; thereafter bringing a second facing of relatively thin gauge material into contact with the other adhesive coated faces of the stiffeners; injecting a foamable material into the space formed by said facings and stiffeners and subjecting the entire panel assemblage of facings, stiffeners and foamable material to an elevated temperature for a relatively short period of time which is still sufficient to effect a foaming and curing of the foamable material and a bonding of the foamable material to said facings and stiffeners; and during exposure of said assemblage to the elevated temperature allowing said stiffeners and facings to freely move and shift relative to each other but without adversely affecting the bonds between stiffeners and facings and thereafter allowing said entire assemblage to cool down from said elevated temperature to room temperature for a sufficient period of time for said adhesive material of said coatings to fully set up and provide relatively rigid glue lines between said stiffeners and facings.

14. The process as set forth in claim 13, including the step of applying end tension to said facings at least during the period of exposure of said facings to said elevated temperature.

15. A process as set forth in claim 13 wherein the stiffeners are made of a cellulosic material, the said facings are selected from the group consisting of aluminum and aluminum alloys of a gauge of between 0.0015 and 0.050' and the foamable material is a urethane composition.

16. The process as set forth in claim 13 including the step of depositing a further series of stiffeners the opposing faces of which are coated with said adhesive material and having different expansion and contraction characteristics from those of said facings upon said one facing and crosswise of said first mentioned stiffeners prior to the application of said second facing to the first mentioned stiffeners and forming a series of compartments between said facings for the reception of the foamable material therein.

References Cited

UNITED STATES PATENTS

| | | | |
|---|---|---|---|
| 2,744,042 | 5/1956 | Pace | 156—79 |
| 3,139,369 | 6/1964 | Sullivan et al. | 156—79 |
| 3,166,831 | 1/1965 | Keith | 156—79 |
| 3,233,576 | 2/1966 | Voelker | 156—79 |
| 3,246,058 | 4/1966 | Voelker | 156—79 |
| 3,255,062 | 6/1966 | Wilkins | 156—79 |
| 3,446,692 | 5/1969 | Turnbull | 264—45 |

CARL D. QUARFORTH, Primary Examiner

B. H. HUNT, Assistant Examiner

U.S. Cl. X.R.

156—77; 264—45